US012745080B2

(12) United States Patent
Khare et al.

(10) Patent No.: US 12,745,080 B2
(45) Date of Patent: Sep. 22, 2026

(54) NON-3GPP ACCESS AUTHENTICATION

(71) Applicant: Nokia Technologies Oy, Espoo (FI)

(72) Inventors: Saurabh Khare, Bangalore (IN); Ranganathan Mavureddi Dhanasekaran, Munich (DE)

(73) Assignee: Nokia Technologies Oy, Espoo (FI)

( * ) Notice: Subject to any disclaimer, the term of this patent is extended or adjusted under 35 U.S.C. 154(b) by 226 days.

(21) Appl. No.: 18/788,851

(22) Filed: Jul. 30, 2024

(65) Prior Publication Data

US 2025/0063354 A1 Feb. 20, 2025

(30) Foreign Application Priority Data

Aug. 14, 2023 (IN) ............................ 202311054486

(51) Int. Cl.
*H04W 12/06* (2021.01)
*H04W 8/20* (2009.01)
(Continued)

(52) U.S. Cl.
CPC ............ *H04W 12/06* (2013.01); *H04W 8/20* (2013.01); *H04W 84/042* (2013.01); *H04W 84/12* (2013.01)

(58) Field of Classification Search
CPC . H04L 27/2601; H04L 5/0053; H04L 5/0094; H04L 5/00; H04L 9/32; H04W 28/0268; H04W 28/10; H04W 76/10; H04W 80/02; H04W 76/12; H04W 28/02; H04W 80/10; H04W 76/20; H04W 52/0235; H04W 74/0833; H04W 76/27; H04W 76/28; H04W 72/21; H04W 72/23; H04W 4/70; H04W 52/02; H04W 72/04; H04W 74/04; H04W 74/08; H04W 76/00; H04W 72/12; H04W 12/06; H04W 8/20; H04W 84/042; H04W 84/12;
(Continued)

(56) References Cited

U.S. PATENT DOCUMENTS

2018/0206117 A1* 7/2018 Stahl .................... H04W 12/35
2019/0098502 A1* 3/2019 Torvinen .......... H04W 12/0433
(Continued)

FOREIGN PATENT DOCUMENTS

WO WO-2014185832 A1 * 11/2014 ........... H04W 76/11

OTHER PUBLICATIONS

"3rd Generation Partnership Project; Technical Specification Group Core Network and Terminals; Non-Access-Stratum (NAS) protocol for 5G System (5GS); Stage 3; (Release 18)", 3GPP 3GPP TS 24.501, V18.3.1, Jun. 2023, pp. 1-1115.
(Continued)

*Primary Examiner* — Nathan S Taylor
(74) *Attorney, Agent, or Firm* — Lippes Mathias LLP

(57) ABSTRACT

Various embodiments provide methods and related devices for non-3GPP access authentication. According to one embodiment, a method performed by a user equipment (UE) comprises transmitting, to a wireless access node in a wireless access network, a request message for access authentication comprising a concealed identity of the UE in a decorated network access identifier, NAI, format in which a username of the concealed identity of the UE in a NAI format is concatenated with a visited public land mobile network, VPLMN, identifier of a VPLMN serving the UE.

17 Claims, 8 Drawing Sheets

(51) Int. Cl.
*H04W 84/04* (2009.01)
*H04W 84/12* (2009.01)

(58) Field of Classification Search
CPC . H04W 84/04; H04W 12/041; H04W 12/069; H04W 12/084; H04W 12/72; H04W 48/18; H04W 76/19; Y02D 30/70
USPC .......................................................... 370/32
See application file for complete search history.

(56) References Cited

U.S. PATENT DOCUMENTS

| | | | | |
|---|---|---|---|---|
| 2019/0223063 | A1* | 7/2019 | Palanigounder ...... | H04W 12/06 |
| 2021/0037604 | A1* | 2/2021 | Malthankar ........... | H04W 76/12 |
| 2023/0231708 | A1* | 7/2023 | Palanigounder ...... | H04W 12/06 713/171 |
| 2024/0283869 | A1* | 8/2024 | Verma ..................... | H04L 61/50 |
| 2025/0274751 | A1* | 8/2025 | Wang .................... | H04W 12/02 |
| 2025/0365686 | A1* | 11/2025 | Li ......................... | H04W 12/06 |
| 2026/0040071 | A1* | 2/2026 | Salkintzis ............. | H04W 12/06 |

OTHER PUBLICATIONS

"3rd Generation Partnership Project; Technical Specification Group Core Network and Terminals; 5G System; Unified Data Management Services; Stage 3 (Release 18)", 3GPP TS 29.503, V18.2.0, Jun. 2023, pp. 1-628.

"SN authentication for R17 NSWO", 3GPP TSG-SA3 Meeting #112, S3-233735, Huawei, Aug. 14 -18, 2023, 3 pages.

"3rd Generation Partnership Project; Technical Specification Group Services and System Aspects; System architecture for the 5G System (5GS); Stage 2 (Release 18)", 3GPP TS 23.501, V18.2.2, Jul. 2023, pp. 1-694.

"3rd Generation Partnership Project; Technical Specification Group Services and System Aspects; Policy and charging control framework for the 5G System (5GS); Stage 2 (Release 18)", 3GPP TS 23.503, V18.2.0, Jun. 2023, pp. 1-182.

"3rd Generation Partnership Project; Technical Specification Group Services and System Aspects; Security architecture and procedures for 5G system (Release 18)", 3GPP TS 33.501, V18.2.0, Jun. 2023, pp. 1-308.

"3rd Generation Partnership Project; Technical Specification Group Services and System Aspects; System architecture for the 5G System (5GS); Stage 2 (Release 18)", 3GPP TS 23.501, V18.2.0, Jun. 2023, pp. 1-694.

"3rd Generation Partnership Project; Technical Specification Group Services and System Aspects; Procedures for the 5G System (5GS); Stage 2 (Release 18)", 3GPP TS 23.502, V18.2.0, Jun. 2023, pp. 1-895.

"3rd Generation Partnership Project; Technical Specification Group Core Network and Terminals; Numbering, addressing and identification; (Release 18)", 3GPP TS 23.003, V18.2.0, Jun. 2023, pp. 1-155.

* cited by examiner

NON-3GPP ACCESS AUTHENTICATION

TECHNICAL FIELD

Embodiments of the present disclosure generally relate to wireless communication, and more particularly, to non-3GPP access authentication in a communication network, in particular a fifth generation (5G) system (5GS).

BACKGROUND

Non-Seamless Wireless Local Area Network (WLAN) Offload (NSWO) is an optional capability of a User Equipment (UE) supporting WLAN radio access, which is also considered as a non-3GPP access. The architecture to support authentication for NSWO in 5GS is defined in clause 4.2.15 of TS 23.501 v18.2.2.

A UE supporting NSWO may, while connected to a WLAN access network, route specific data flows via the WLAN access network without traversing 5G core (5GC). These specific data flows are identified using UE Route Selection Policy (URSP) configuration for NSWO, or local configurations of the UE as defined in TS 23.503 v 18.2.0. For these data flows, the UE uses the local IP address allocated by the WLAN access network and no IP address preservation is provided between WLAN and Next Generation Radio Access Network (NG-RAN).

For performing the NSWO, the UE needs to acquire a local IP address from the WLAN access network and it is not required to connect to Non-3GPP Interworking Function (N3IWF), Evolved Packet Data Gateway (ePDG) or Trusted Non-3GPP Gateway Function (TNGF). If the WLAN access network is configured to require the 5G System (5GS) based access authentication of the UE for connecting to the WLAN access network, the UE performs an authentication procedure for NSWO in 5GS defined in clause 4.2.15 and in Annex S of TS 33.501 v18.2.0. After successful authentication, the UE is not considered to be entered in 5GS Registered state. The UE can send and receive traffic not traversing the 5GC and which is not under the control of the 5GC.

A non-3GPP access network may be connected via SWa' interface to multiple Public Land Mobile Networks (PLMNs) for 5G NSWO. In a roaming scenario, Home PLMN (HPLMN) may be reached by the UE via a WLAN access network connected to more than one Visited PLMN (VPLMN). Therefore, a UE when roaming shall be able to indicate a specific selected VPLMN (e.g. using decorated a network access identifier (NAI) for 5G NSWO) through which the NSWO request should be sent towards the HPLMN.

A UE connected to a WLAN access network using 5GS credentials (as shown in FIG. 4.2.15-1 in TS 23.501 v18.2.0) may also be connected to the 5GC, for example to establish a protocol data unit (PDU) session. For example, the UE may be connected to the 5GC either via another access type (such as NG-RAN), or via the same WLAN access network by performing the 5GS registration via Untrusted non-3GPP access procedure (using N3IWF) or interworking between ePDG connected to Evolved Packet Core (EPC) and 5GS (using ePDG) defined in TS 23.502 v18.2.0.

When a UE is connected to a WLAN access network (e.g. using 5GS credentials) and using an Untrusted non-3GPP access procedure, the UE can perform Non-Seamless WLAN Offload of some or all data traffic to this WLAN access network, sending the traffic outside the IPSec tunnel encapsulation as defined in URSP rules with Non-Seamless WLAN Offload indication.

A UE may use a Registration procedure for Trusted non-3GPP access as defined in clause 4.12a.2.2 of TS 23.502 v18.2.0, and then determine to send some traffic (to be subject to Non-seamless WLAN offload) outside of the IPSec tunnel established with the TNGF. Note, a UE cannot first connect to a WLAN access network using 5GS credentials without performing 5GS registration, and then later, on this WLAN access network, perform 5GS registration using the Trusted non-3GPP access procedure without first having to release the WLAN and then to establish a new WLAN association per the Registration procedure for Trusted non-3GPP access as defined in clause 4.12a.2.2 of TS 23.502 v18.2.0.

When a UE decides to use 5G NSWO to connect to a WLAN access network using its 5GS credentials but without registration to 5GS, a network access identifier (NAI) format for 5G NSWO is used. The NAI format for 5G NSWO is defined in TS 23.003 v18.2.0. Decorated NAI format for Subscription Concealed Identifier (SUCI)

A decorated NAI shall take the form of a NAI and shall have the form "homerealm!username@otherrealm" as specified in clause 2.7 of the IETF RFC 4282.

The realm part of Decorated NAI consists of "otherrealm", see the IETF draft 2486-bisRFC 4282. "Homerealm" is the realm as specified in clause 14.2 of TS23.003, using HPLMN ID ("homeMCC"+"homeMNC"). "Otherrealm" is the realm built using the VPLMN ID ("visited MCC"+"visited MNC") of the PLMN selected as a result of WLAN PLMN selection (see 3GPP TS 24.234 v12.2.0).

The username part format of a Root NAI shall comply with IETF RFC 4187 when Extensible Authentication Protocol (EAP) Authentication and Key Agreement (AKA) authentication is used and comply with IETF RFC 4186, when EAP Subscriber Identity Module (SIM) authentication is used. When the username part of Decorated NAI includes International Mobile Subscriber Identity (IMSI), it shall be built following the same steps as specified for Root NAI in clause 14.3 of TS23.003 v18.2.0.

Thus, the decorated NAI will take the form:

"wlan.mnc<homeMNC>.mcc<homeMCC>0.3gppnetwork.org!0<IMSI>@wlan.mnc<visitedMNC>.mcc<visitedMCC>0.3gppnetwork.org", for EAP AKA authentication, and"

wlan.mnc<homeMNC>.mcc<homeMCC>0.3gppnetwork.org!1<IMSI>@wlan.mnc<visited MNC>.mcc<visitedMCC>0.3gppnetwork.org", for EAP SIM authentication.

For example, for EAP AKA authentication, assume that the IMSI is 234150999999999 (MCC=234, MNC=15) and the PLMN ID of the selected PLMN is MCC=610, MNC=71, then the Decorated NAI takes the form "wlan.mnc015.mcc234.3gppnetwork.org!0234150999999999@wlan.mnc071.mcc610.3gpp network.org".

Note that the "otherrealm" specified in the present disclosure is resolved by a WLAN access node (AN). If the WLAN AN does not have access to the GRX, the WLAN AN should resolve the realm by other means, e.g. static look-up table, private local DNS server acting as an authoritative name server for that sub-domain.

NAI used for 5G NSWO

When the UE decides to use 5G NSWO to connect to the WLAN access network using its 5GS credentials but without registration to 5GS, the NAI format for 5G NSWO in non-roaming scenarios is used. The NAI format for 5G NSWO in non-roaming scenarios is defined in clause 28.7.9.2 of TS 23.003 v18.2.0. In this case, the NAI realm is different than the realm defined for usage during 5G registration via Trusted non-3GPP access to the 5G core network (CN) (defined in clauses 28.7.6 of TS 23.003 v18.2.0) or when N5CW devices access 5GCN via Trusted non-3GPP access to the 5GCN (see clause 28.7.7 of TS 23.003 v18.2.0).

In the 5G NSWO use case, the UE shall use a NAI in the following format:

"<username>@5gc-nswo.mnc<MNC>.mcc<MCC>0.3gppnetwork.org", for PLMNs;

"<username>@5gc-nswo.nid<NID>.mnc<MNC>.mcc<MCC>0.3gppnetwork.org", for Stand-alone Non-Public Networks (SNPNs).

In the above use cases, a) the username part is defined in clause 28.7.3 of TS 23.003 v18.2.0; and b) the label "5gc-nswo" in the realm part indicates that the NAI is used for 5G NSWO. For PLMNs, <MNC> and <MCC> identify a PLMN, and for SNPNs, <NID>, <MNC> and <MCC> identify a SNPN, to which the UE attempts to connect via the 5G NSWO as described in clause 4.2.15 of 3GPP TS 23.501 v18.2.0.

Decorated NAI Used for 5G NSWO

The decorated NAI used for 5G NSWO in roaming scenarios shall take the form of a NAI as defined in clause 28.7.9.1 of TS23.003 18.2.0, where the "Homerealm" and the "otherealm" shall be preceded by the label "5gc-nswo".

Thus, the decorated NAI will take the form:

"5gc-nswo.mnc<homeMNC>.mcc<home MCC>0.3gppnetwork.org!<username of SUCI in NAI format>@5gc-nswo.mnc<visitedMNC>.mcc<visited MCC>0.3gppnetwork.org".

For example, assume the IMSI 234150999999999, where MCC=234, MNC=15 and MSISN=0999999999, the Routing Indicator 678, a Home Network Public Key Identifier of 27, the null-scheme, and the Visited PLMN ID (MCC=610, MNC=71), then the NAI format for SUCI for 5G NSWO takes the form: "type0.rid678.schid0.userid0999999999@5gc-nswo.mnc015.mcc234.3gppnetwork.org";

the decorated NAI format for SUCI for 5G NSWO roaming takes the form:

"5gc-nswo.mnc015.mcc234.3gppnetwork.org!type0.rid678.schid0.userid0999999999@ 5gc-nswo.mnc071.mcc610.3gppnetwork.org".

However, the decorated NAI with VPLMN information could be attacked and modified by the Man in the Middle (MiTM), and UE will be spoofed to access a malicious WLAN AN. For example, a malicious WLAN AN can broadcast PLMN IDx. A UE could be tricked to connect to the malicious WLAN AN, and initiate an NSWO authentication procedure with decorative SUCI (PLMN IDx or serving network (SN) name=PLMNx). Because the decorative SUCI contains VPLMN identifier (ID)/SN Name which is not protected, the malicious WLAN AN can modify the SN Name=PLMNy (or Home PLMN) which is more trusted to HPLMN. Then the HPLMN identifies the VPLMN via the decorative SUCI (PLMNy), and allows the registration/authentication. After successful NSWO authentication, the malicious WLAN AN will be trusted by the UE, and the malicious WLAN AN can initiate many attacks, e.g. eavesdropping, impersonate, tamper, etc.

SUMMARY

This summary is provided to introduce simplified concepts of subnetwork configuration and procedures to enable subnetwork operations, particularly on subnetwork identities. This summary is not intended to identify key features or essential features of the claimed subject matter, nor is it intended to be used to limit the scope of the claimed subject matter.

In view of the above described spoofing and MiTM attack, it is proposed in the present disclosure to concatenate a VPLMN ID along with a username in a decorated NAI, so that it will be also considered for SUCI concealment at UE, and it will be available in an output of a protection scheme for concealing a plain text UE identifier. In Unified Data Management (UDM)/SIDF (Subscription Identifier De-concealing Function), as well the SUCI de-concealment is performed and the VPLMN ID is retrieved. The retrieved VPLMN from the concealed part of the SUCI is compared with plain text VPLMN information in the decorated NAI or with the serving network name (SNN) information from NSWO function (NSWOF). In case that the MiTM modified the plain text of the decorated NAI, the concealed part will be used for further key derivation and AKA challenge of NSWO authentication. Alternatively, UDM/Authentication Server Function (AUSF) can reject the authentication/registration request.

According to a first aspect of the disclosure, there is provided a user equipment (UE). The UE comprises at least one processor, and at least one memory storing instructions that, when executed by the one or more processors, cause the UE to transmit, to a wireless access node in a wireless access network, a request message for access authentication comprising a concealed identity of the UE in a decorated NAI format in which a username of the concealed identity of the UE in a NAI format is concatenated with a VPLMN identifier of a VPLMN serving the UE.

According to a second aspect of the disclosure, there is provided a first network entity. The first network entity comprises at least one processor, and at least one memory storing instructions that, when executed by the one or more processors, cause the first network entity to receive, from a wireless access node in a wireless access network, a first message comprising a concealed identity of a UE to be authenticated in a decorated NAI format in which a username of the concealed identity of the UE in a NAI format is concatenated with a VPLMN identifier of a VPLMN serving the UE, obtain the VPLMN identifier from a realm part of the concealed identity, and send, to a network entity for authentication server function, a request message for authentication comprising the concealed identity of the UE and the obtained VPLMN identifier.

According to a third aspect of the disclosure, there is provided a second network entity. The second network entity comprises at least one processor, and at least one memory storing instructions that, when executed by the one or more processors, cause the second network entity to receive, from a network entity for authentication server function, a request message for authentication credential comprising a concealed identity of a UE to be authenticated in a decorated NAI format in which a username of the concealed identity of the UE in a NAI format is concatenated with a VPLMN identifier of a VPLMN serving the UE, de-conceal the concealed identity of the UE to obtain the VPLMN identifier and a first identity of the UE; determine whether the de-concealed VPLMN identifier is same as the VPLMN identifier in a realm part of the concealed identity of the UE; and in response to the determination that the de-concealed VPLMN identifier is same as the VPLMN identifier in the realm part, send, to the network entity for authentication server function, a response message for authentication comprising a generated authentication vector and the first identity of the UE.

According to a fourth aspect of the disclosure, there is provided a method performed by a UE. The method comprises transmitting, to a wireless access node in a wireless access network, a request message for access authentication comprising a concealed identity of the UE in a decorated NAI format in which a username of the concealed identity of the UE in a NAI format is concatenated with a VPLMN identifier of a VPLMN serving the UE.

According to a fifth aspect of the disclosure, there is provided a method performed by a first network entity. The method comprises: receiving, from a wireless access node in a wireless access network, a first message comprising a concealed identity of a UE to be authenticated in a decorated NAI format in which a username of the concealed identity of the UE in a NAI format is concatenated with a VPLMN identifier of a VPLMN serving the UE, obtaining the VPLMN identifier from a realm part of the concealed identity, and sending, to a network entity for authentication server function, a request message for authentication comprising the concealed identity of the UE and the obtained VPLMN identifier.

According to a sixth aspect of the disclosure, there is provided a method performed by a second network entity. The method comprises: receiving, from a network entity for authentication server function, a request message for authentication credential comprising a concealed identity of a UE to be authenticated in a decorated NAI format in which a username of the concealed identity of the UE in a NAI format is concatenated with a VPLMN identifier of a VPLMN serving the UE, de-concealing the concealed identity of the UE to obtain the VPLMN identifier and a first identity of the UE, determining whether the de-concealed VPLMN identifier is same as the VPLMN identifier in a realm part of the concealed identity of the UE, and in response to the determination that the de-concealed VPLMN identifier is same as the VPLMN identifier in the realm part, sending, to the network entity for authentication server function, a response message for authentication comprising a generated authentication vector and the first identity of the UE.

According to a seventh aspect of the present disclosure, it is provided a UE comprising means for performing any step of the method according to the fourth aspect.

According to an eighth aspect of the present disclosure, it is provided a first network entity comprising means for performing any step of the method according to the fifth aspect.

According to a ninth aspect of the present disclosure, it is provided a second network entity comprising means for performing any step of the method according to the sixth aspect According to a tenth aspect of the present disclosure, it is provided a computer readable storage medium, on which instructions are stored, when executed by at least one processor, the instructions cause the at least one processor to perform any method according to any of the fourth, fifth, and sixth aspects.

According to an eleventh aspect of the present disclosure, it is provided a computer program product comprising instructions which when executed by at least one processor, cause the at least one processor to perform any method according to any of the fourth, fifth, and sixth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings in which.

DETAILED DESCRIPTION

Figure 1:
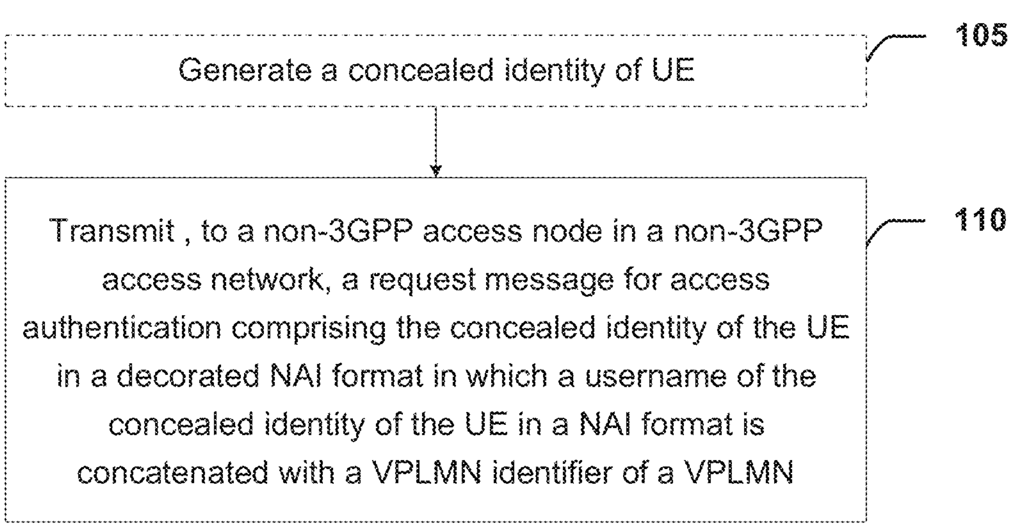
FIG. 1 is a flow chart illustrating a method performed by a UE according to some embodiments of the present disclosure.

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout.

In the following description and claims, unless defined otherwise, all technical and scientific terms used herein have the same meaning as commonly understood by one of ordinary skills in the art to which this disclosure belongs.

References in the present disclosure to “one embodiment”, “an embodiment”, “an example embodiment”, and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms “first” and “second” etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of "circuitry" applies to all uses of this term in this application, including in any claims. As a further example, as used in this application, the term "circuitry" also covers an implementation of merely a hardware circuit or processor (or multiple processors) or portion of a hardware circuit or processor and its (or their) accompanying software and/or firmware. The term "circuitry" also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, 5G, the future sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "user equipment (UE)" refers to any end device that can access a communication network and receive services therefrom. By way of example and not limitation, the UE may be a combination of a Universal Integrated Circuit Card (UICC)/Subscriber Identity Module (SIM) Card and a mobile equipment (ME).

As used herein, the term "network entity" refers to any entity for implementing or supporting a network function in a communication network. The network entity can be implemented in a physical network node, or in a virtual network node which perform a function by logical resources in more than one physical network node.

As described above, the decorated NAI with VPLMN information could be attacked and modified by the Man in the Middle (MiTM), and thus UE could be spoofed to access the malicious WLAN AN.

Thus, the embodiments of the present disclosure propose an improved solution to non-3GPP access authentication. In the embodiments, VPLMN information is concatenated with a username in a decorated NAI format, in particular, for 5G NSWO authentication, so that the UE can be protected from accessing to the malicious WLAN AN.

FIG. 1 shows a flow chart illustrating a method 100 performed by a UE according to some embodiments of the present disclosure. In the figure, optional steps are shown in a dashed box.

As shown in FIG. 1, the UE transmits a request message for access authentication to a wireless access node in a wireless access network, at block 110. The request message may include a concealed identity of the UE in a novel protected decorated NAI format. In this protected decorated NAI format, a username of the concealed identity of the UE in a NAI format is concatenated with a VPLMN identifier of a VPLMN serving the UE, as shown below. In some embodiments, the concealed identity of the UE may be the SUCI of the UE.

As described above, the conventional decorated NAI format is as below:

| Homerealm | ! | username | @ | Otherrealm | | |
|---|---|---|---|---|---|---|
| or | | | | | | |
| Visitedrealm | ! | Homerealm | ! | username | @ | Otherrealm |

In some embodiments, the protected decorated NAI format may be as below:

| Homerealm | ! | Username concatenated with VPLMN ID | @ | Otherrealm | | |
|---|---|---|---|---|---|---|
| or | | | | | | |
| Visitedrealm | ! | Homerealm | ! | username concatenated with VPLMN ID | @ | Other-realm |

In some embodiments, the protected decorated NAI format and the NAI format may be used for 5G NSWO. As described above, the conventional decorated NAI used for 5G NSWO takes the form of NAI as defined in clause 28.7.9.1 of TS23.003 18.2.0, where the "Homerealm" and the "otherrealm" shall be preceded by the label "5gc-nswo". In some embodiments, the protected decorated NAI format for 5G NSWO may take the form: "5gc-nswo.mnc<homeMNC>.mcc <homeMCC>0.3gppnetwork.org!<username of SUCI in NAI format concatenated with VPLMN ID>@5gc-nswo.mnc<visitedMNC>.mcc<visitedMCC>0.3gppnetwork.org".

For example, assuming the IMSI 234150999999999, where MCC=234, MNC=15 and MSISN=0999999999, the Routing Indicator 678, a Home Network Public Key Identifier of 27, the null-scheme, and the Visited PLMN ID (MCC=610, MNC=71), then the NAI format for SUCI for 5G NSWO takes the form: "type0.rid678.schid0.userid0999999999@5gc-nswo.mnc015.mcc234.3gppnetwork.org", and the protected decorated NAI format for SUCI for 5G NSWO roaming takes the form: 5gc-nswo.mnc015.mcc234.3gppnetwork.org!type0.rid678.schid0.userid0999999999071610@5g c-nswo.mnc071.mcc610.3gppnetwork.org".

In some embodiment of the present disclosure, the wireless access network may be any non-3GPP access network, e.g., a WLAN access network, and the wireless access node may be any non-3GPP access node, e.g., a WLAN access point. In some embodiments, the request message for access authentication may be an EAP-ID-Response message.

In some embodiments, before the transmitting at block 110, the UE may generate the concealed identity of the UE by ciphering a first identity of the UE concatenated with the VPLMN identifier, at block 105. In some embodiments, the first identity of the UE may be SUPI of the UE. In some embodiments, the ciphering may be based on ECIES.

Figure 2:
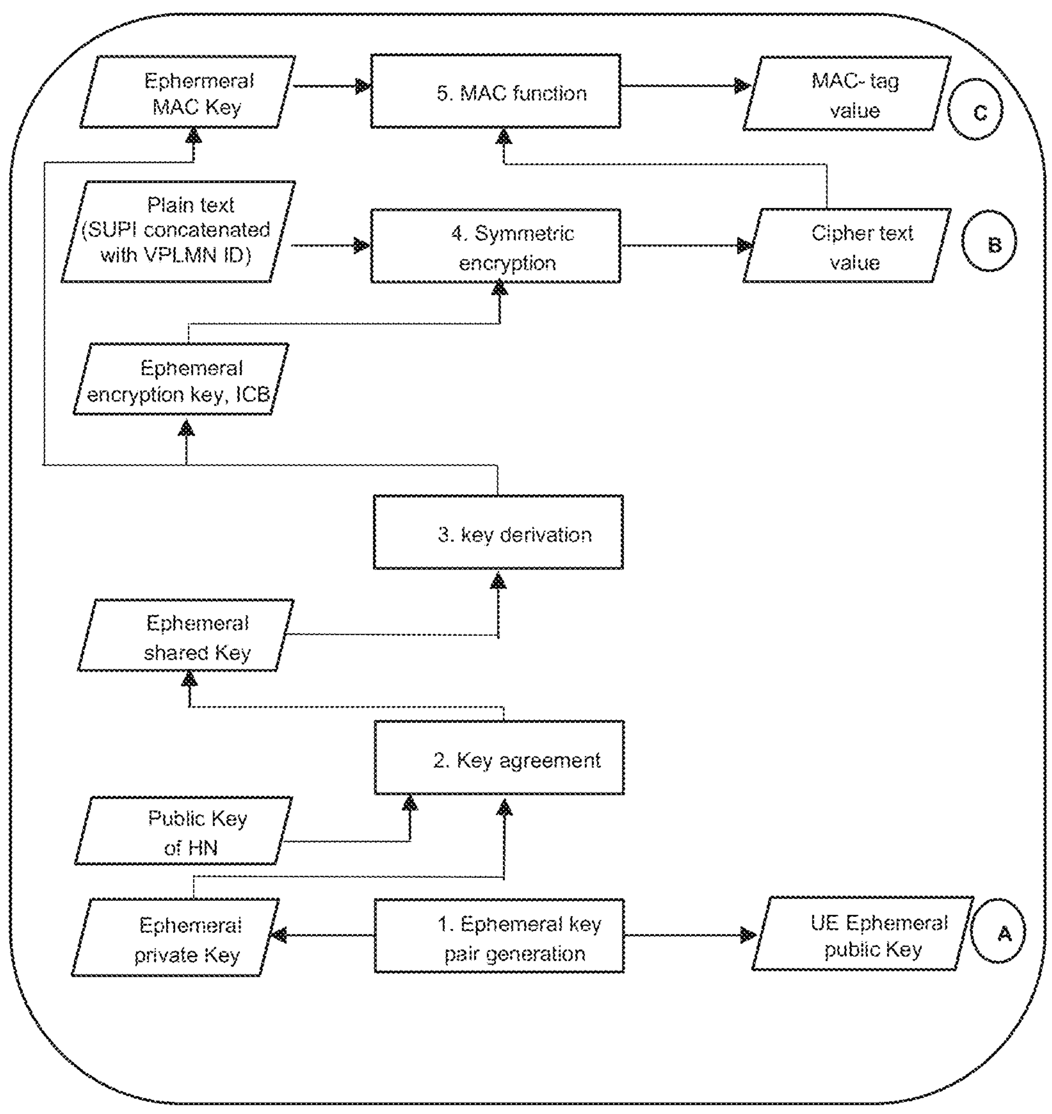
FIG. 2 is a schematic diagram illustrating SUCI concealment based on elliptic curve integrate encrypt scheme (ECIES) at the UE according to some embodiments of the present disclosure.

FIG. 2 schematically illustrates SUCI concealment based on ECIES at the UE according to some embodiments of the present disclosure. As shown in FIG. 2, at operation 1, UE generates a key pair (Ephemeral public key and private key) using key pair generation primitive. Based on the Diffie-Hellman primitive, a shared secret key element is derived from a public key of Home Network (HN) and the generated ephemeral private key, at operation 2. Followed by that, at operation 3, key derivative function KDF is used to generate keying data K of length including Encryption Key (EK)+Initial counter block (ICB)+MAC key. With the derived keys EK and ICB, symmetric encryption is performed at operation 4 to encrypt the plaintext block (SUPI concatenated with VPLMN ID) to generate the ciphered text value. Then the UE uses the tagging operation of the MAC scheme to compute the tag for the ciphered text of SUPI concatenated with VPLMN ID using generated MAC key, at operation 5.

Figure 3:
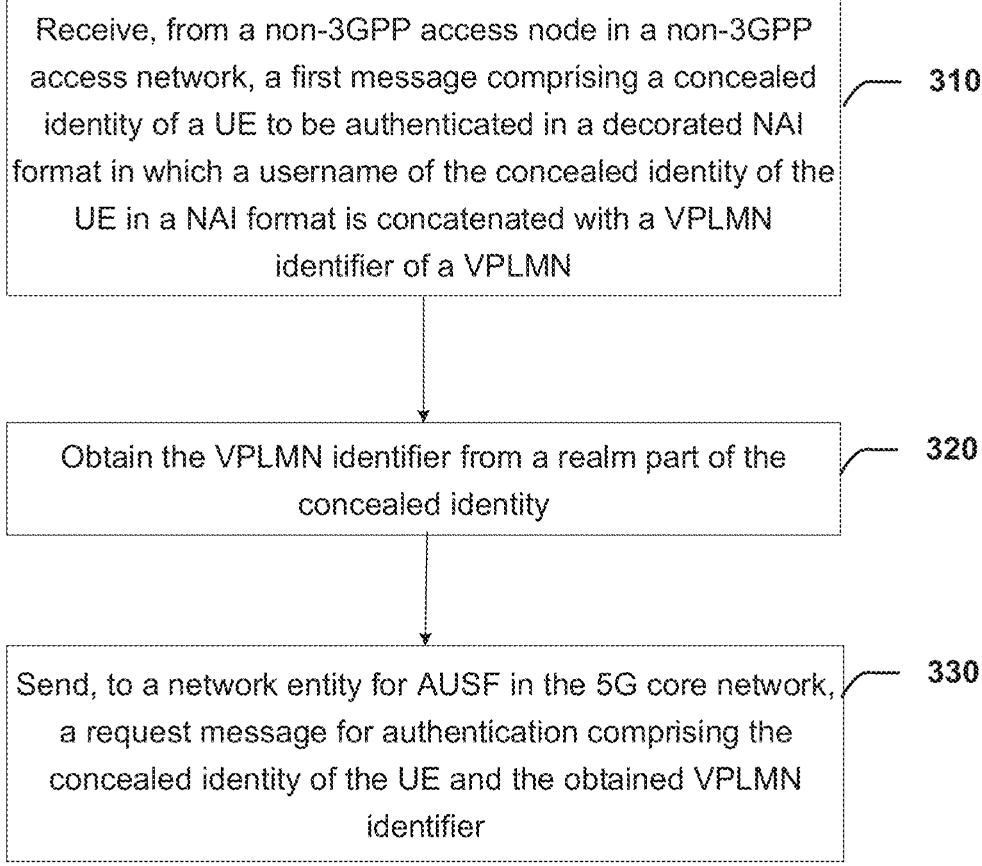
FIG. 3 is a flow chart illustrating a method performed by a first network entity according to some embodiments of the present disclosure.

FIG. 3 shows a flow chart illustrating a method 200 performed by a first network entity according to some embodiments of the present disclosure. In some embodiments, the first network entity may be a NSWO function (NSWOF) in a core network, e.g. 5G core (5GC) network.

As shown in FIG. 3, the first network entity receives, from a wireless access node in a wireless access network, a first message, at block 310. The first message comprises a concealed identity of a UE to be authenticated in the protected decorated NAI format in which a username of the concealed identity of the UE in a NAI format is concatenated with a VPLMN identifier of a VPLMN serving the UE. The details of the protected decorated NAI format have been presented in the above description and will be omitted herein. In some embodiments, the concealed identity of the UE may be SUCI of the UE.

At block 320, the first network entity obtains the VPLMN identifier from a realm part of the concealed identity. As described above, the realm part "otherrealm" of the protected decorated NAI format for SUCI is built using the plain text VPLMN identifier, thus the first network entity can obtain the VPLMN identifier from the realm part.

Then at block 330, the first network entity sends, to a network entity for authentication server function (AUSF), a request message for authentication which includes the concealed identity of the UE and the obtained VPLMN identifier. In some embodiments, the request message for authentication may be Nausf_UE_Authentication Authenticate Request.

Figure 4:
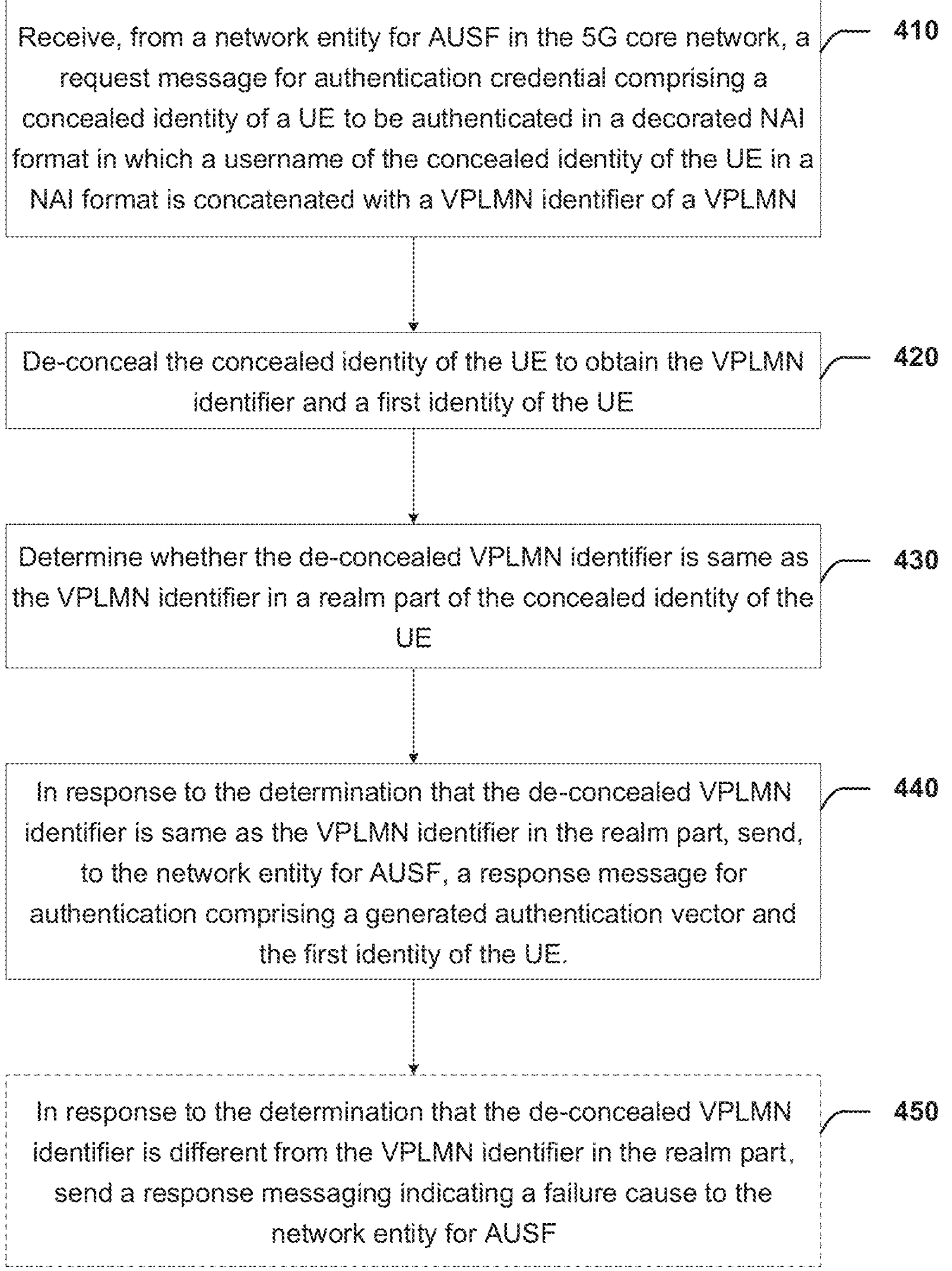
FIG. 4 is a flow chart illustrating a method performed by a second network entity according to some embodiments of the present disclosure.

FIG. 4 shows a flow chart illustrating a method performed by a second network entity according to some embodiments of the present disclosure. In some embodiments, the second network entity may be UDM in a core network, e.g., a 5GC network. In the figure, optional steps are shown in a dashed box.

As shown in FIG. 4, the second network entity receives, from a network entity for authentication server function (AUSF), a request message for authentication credential, at block 410. The request message for authentication credential comprises a concealed identity of a UE to be authenticated in a protected decorated NAI format in which a username of the concealed identity of the UE in a NAI format is concatenated with a VPLMN identifier of a VPLMN serving the UE. The details of the protected decorated NAI format have been presented in the above description and will be omitted herein. In some embodiments, the concealed identity of the UE may be SUCI of the UE.

Upon receipt of the request message from the AUSF, the second network entity de-conceals the concealed identity of the UE to obtain the VPLMN identifier and a first identity of the UE, at block 420. In some embodiments, the second network entity may de-cipher the concealed identity of the UE to obtain the first identity concatenated with the VPLMN identifier, and retrieve the VPLMN identifier from the concatenated first identity and the VPLMN identifier. In some embodiments, the first identity of the UE may be SUPI of the UE.

Figure 5:
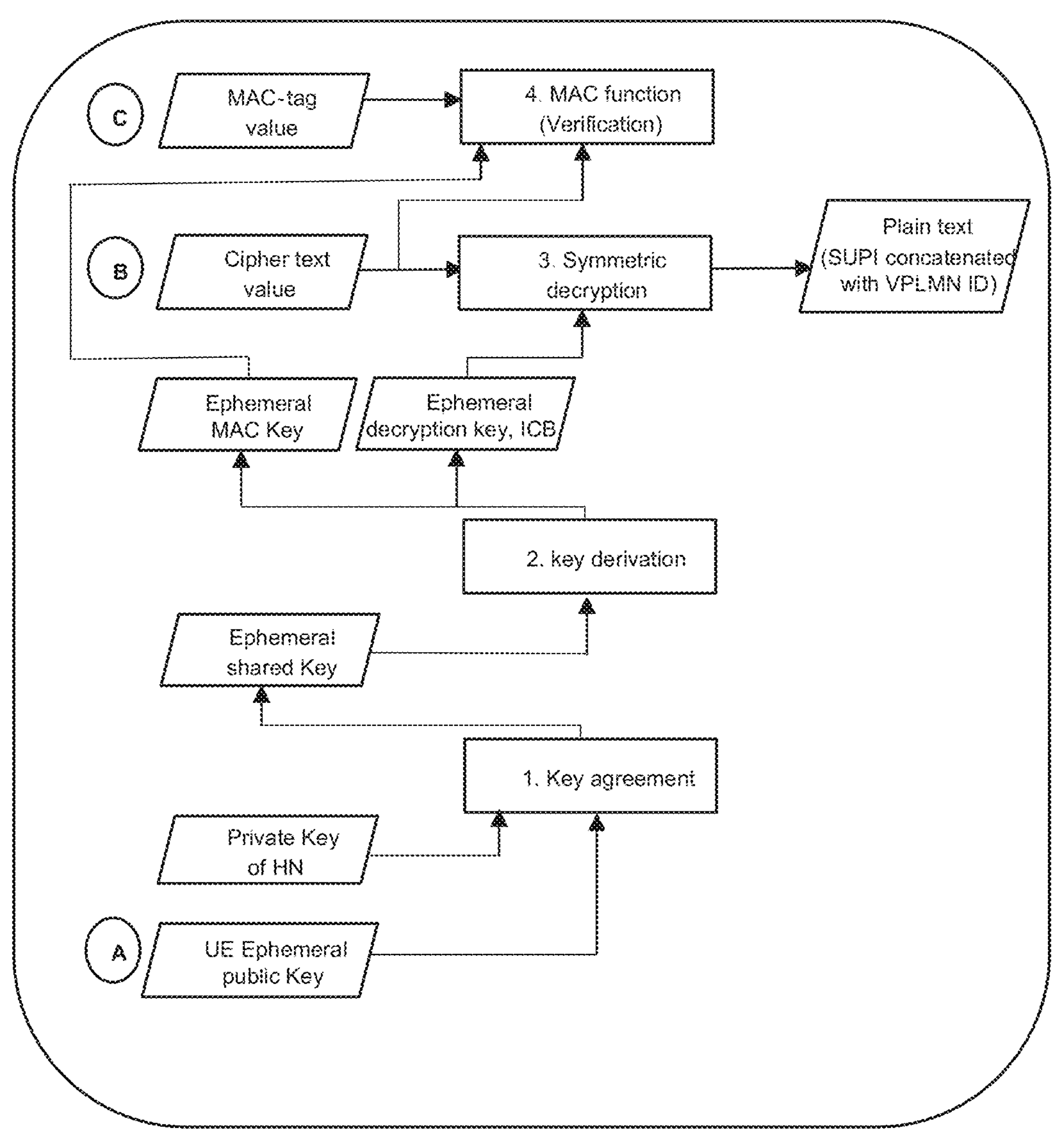
FIG. 5 is a schematic diagram illustrating SUCI de-concealment based on ECIES at home environment according to some embodiments of the present disclosure.

FIG. 5 illustrates SUCI de-concealment based on ECIES at home environment according to some embodiments of the present disclosure. As shown in FIG. 5, at home environment, e.g, at Subscription Identifier De-concealing Function (SIDF), the received UE ephemeral public key and the private key of the home network are used to generate the ephemeral shared key, at operation 1. With the key derivative functions, at operation 2, keying data K of length including decryption Key (DK)+Initial counter block ICB+MAC key is generated. The generated DK and ICB is used to de-cipher the cipher text value (SUCI) using symmetric decryption, at operation 3, to obtain plain text SUPI concatenated with VPLMN ID. Ephemeral MAC keys are used on ciphered text value of concatenated SUPI and VPLMN identifier to generate the expected MAC, which is compared against the received MAC, and with this comparison the integrity of the SUCI is verified. The VPLMN ID can be retrieved from the concatenated SUPI and VPLMN identifier.

Return to FIG. 4, at block 430, the second network entity determines whether the de-concealed VPLMN identifier is same as the VPLMN identifier in a realm part of the concealed identity of the UE. In response to the determination that the de-concealed VPLMN identifier is same as the VPLMN identifier in the realm part, the second network entity sends to the AUSF a response message for authentication which comprises a generated authentication vector and the first identity of the UE, at block 440.

Optionally, in some embodiments, the second network entity may send, to a network entity for access and mobility management function (AMF) associated with the UE, a response message comprising a selected authentication method and a generated authentication vector.

In some embodiments, if the result of determination is that the de-concealed VPLMN identifier is same as the VPLMN identifier in the realm part of the concealed identity of the UE, the second network entity may select EAP AKA prime as an authentication method and generate an authentication vector. Then the second network entity may send the respective response messages to the AUSF and optionally AMF.

In some embodiments, in response to the determination that the de-concealed VPLMN identifier is different from the VPLMN identifier in the realm part, the second network entity sends a response messaging indicating a failure cause to the AUSF, at block 450. The AUSF then forwards the failure cause to the AMF associated with the UE.

Optionally, in some embodiments, in response to the determination that the de-concealed VPLMN identifier is different from the VPLMN identifier in the realm part, the second network entity sends a response message indicating a failure cause to the AMF associated with the UE. The AMF then sends the failure cause ("WLAN AN not allowed") to the UE. This allows the UE to camp on different WLAN AN.

In some embodiments, the failure cause may be WLAN AN not trusted/allowed, and it may be indicated in 5G mobility management (5GMM) cause information element. The purpose of the 5GMM cause information element is to indicate the reason why a 5GMM request from the UE is rejected by the network. The 5GMM cause information element is coded as below

| 8 | 7 | 6 | 5 | 4 | 3 | 2 | 1 | |
|---|---|---|---|---|---|---|---|---|
| 5GMM cause IEI | | | | | | | | octet 1 |
| Cause value | | | | | | | | octet 2 |

The 5GMM cause is a type 3 information element with length of 2 octets. Table 1 shows cause values and descriptions of the 5GMM cause information element.

TABLE 1

| 5GMM cause information element | | | | | | | | |
|---|---|---|---|---|---|---|---|---|
| Cause value (octet 2) Bits | | | | | | | | |
| 8 | 7 | 6 | 5 | 4 | 3 | 2 | 1 | |
| 0 | 0 | 0 | 0 | 0 | 0 | 1 | 1 | Illegal UE |
| 0 | 0 | 0 | 0 | 0 | 1 | 0 | 1 | PEI not accepted |
| 0 | 0 | 0 | 0 | 0 | 1 | 1 | 0 | Illegal ME |
| 0 | 0 | 0 | 0 | 0 | 1 | 1 | 1 | 5GS services not allowed |
| 0 | 0 | 0 | 0 | 1 | 0 | 0 | 1 | UE identity cannot be derived by the network |
| 0 | 0 | 0 | 0 | 1 | 0 | 1 | 0 | Implicitly de-registered |
| 0 | 0 | 0 | 0 | 1 | 0 | 1 | 1 | PLMN not allowed |
| 0 | 0 | 0 | 0 | 1 | 1 | 0 | 0 | Tracking area not allowed |
| 0 | 0 | 0 | 0 | 1 | 1 | 0 | 1 | Roaming not allowed in this tracking area |
| 0 | 0 | 0 | 0 | 1 | 1 | 1 | 1 | No suitable cells in tracking area |
| 0 | 0 | 0 | 1 | 0 | 1 | 0 | 0 | MAC failure |
| 0 | 0 | 0 | 1 | 0 | 1 | 0 | 1 | Synch failure |
| 0 | 0 | 0 | 1 | 0 | 1 | 1 | 0 | Congestion |
| 0 | 0 | 0 | 1 | 0 | 1 | 1 | 1 | UE security capabilities mismatch |
| 0 | 0 | 0 | 1 | 1 | 0 | 0 | 0 | Security mode rejected, unspecified |
| 0 | 0 | 0 | 1 | 1 | 0 | 1 | 0 | Non-5G authentication unacceptable |
| 0 | 0 | 0 | 1 | 1 | 0 | 1 | 1 | N1 mode not allowed |
| 0 | 0 | 0 | 1 | 1 | 1 | 0 | 0 | Restricted service area |
| 0 | 0 | 0 | 1 | 1 | 1 | 1 | 1 | Redirection to EPC required |
| 0 | 0 | 1 | 0 | 1 | 0 | 1 | 1 | LADN not available |
| 0 | 0 | 1 | 1 | 1 | 1 | 1 | 0 | No network slices available |
| 0 | 1 | 0 | 0 | 0 | 0 | 0 | 1 | Maximum number of PDU sessions reached |
| 0 | 1 | 0 | 0 | 0 | 0 | 1 | 1 | Insufficient resources for specific slice and DNN |
| 0 | 1 | 0 | 0 | 0 | 1 | 0 | 1 | Insufficient resources for specific slice |
| 0 | 1 | 0 | 0 | 0 | 1 | 1 | 1 | ngKSI already in use |
| 0 | 1 | 0 | 0 | 1 | 0 | 0 | 0 | Non-3GPP access to 5GCN not allowed |
| 0 | 1 | 0 | 0 | 1 | 0 | 0 | 1 | Serving network not authorized |
| 0 | 1 | 0 | 0 | 1 | 0 | 1 | 0 | Temporarily not authorized for this SNPN |
| 0 | 1 | 0 | 0 | 1 | 0 | 1 | 1 | Permanently not authorized for this SNPN |
| 0 | 1 | 0 | 0 | 1 | 1 | 0 | 0 | Not authorized for this CAG or authorized for CAG cells only |
| 0 | 1 | 0 | 0 | 1 | 1 | 0 | 1 | Wireline access area not allowed |
| 0 | 1 | 0 | 0 | 1 | 1 | 1 | 0 | PLMN not allowed to operate at the present UE location |
| 0 | 1 | 0 | 0 | 1 | 1 | 1 | 1 | UAS services not allowed |
| 0 | 1 | 0 | 1 | 0 | 0 | 0 | 0 | Disaster roaming for the determined PLMN with disaster condition not allowed |
| 0 | 1 | 0 | 1 | 0 | 0 | 0 | 1 | Selected N3IWF is not compatible with the allowed NSSAI |
| 0 | 1 | 0 | 1 | 0 | 0 | 1 | 0 | Selected TNGF is not compatible with the allowed NSSAI |
| 0 | 1 | 0 | 1 | 0 | 0 | 1 | 1 | WLAN AN not allowed |
| 0 | 1 | 0 | 1 | 1 | 0 | 1 | 0 | Payload was not forwarded |
| 0 | 1 | 0 | 1 | 1 | 0 | 1 | 1 | DNN not supported or not subscribed in the slice |
| 0 | 1 | 0 | 1 | 1 | 1 | 0 | 0 | Insufficient user-plane resources for the PDU session |
| 0 | 1 | 0 | 1 | 1 | 1 | 0 | 1 | Onboarding services terminated |
| 0 | 1 | 0 | 1 | 1 | 1 | 1 | 1 | Semantically incorrect message |
| 0 | 1 | 1 | 0 | 0 | 0 | 0 | 0 | Invalid mandatory information |
| 0 | 1 | 1 | 0 | 0 | 0 | 0 | 1 | Message type non-existent or not implemented |
| 0 | 1 | 1 | 0 | 0 | 0 | 1 | 0 | Message type not compatible with the protocol state |

TABLE 1-continued

| 5GMM cause information element | | | | | | | | |
|---|---|---|---|---|---|---|---|---|
| Cause value (octet 2) Bits | | | | | | | | |
| 8 | 7 | 6 | 5 | 4 | 3 | 2 | 1 | |
| 0 | 1 | 1 | 0 | 0 | 0 | 1 | 1 | Information element non-existent or not implemented |
| 0 | 1 | 1 | 0 | 0 | 1 | 0 | 0 | Conditional IE error |
| 0 | 1 | 1 | 0 | 0 | 1 | 0 | 1 | Message not compatible with the protocol state |
| 0 | 1 | 1 | 0 | 1 | 1 | 1 | 1 | Protocol error, unspecified |

Any other value received by the mobile station shall be treated as 0110 1111, "protocol error, unspecified". Any other value received by the network shall be treated as 0110 1111, "protocol error, unspecified".

Figure 6:
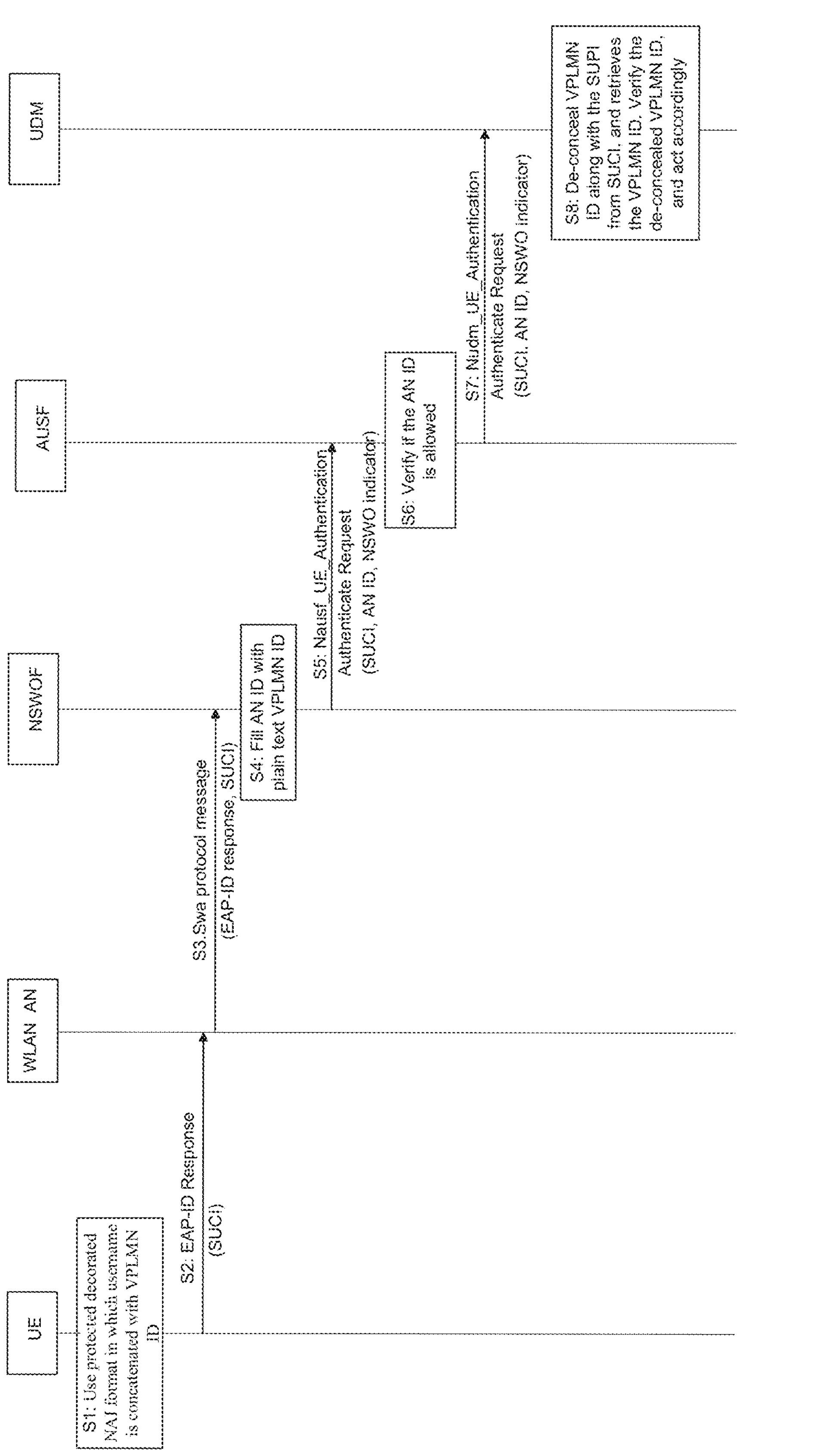
FIG. 6 schematically shows a signaling sequence diagram for non-3GPP access authentication according to some embodiments of the present disclosure.

FIG. 6 schematically shows a signaling sequence diagram for non-3GPP access authentication according to some embodiments of the present disclosure, in which the methods of FIGS. 1, 3 and 4 are applied.

In S1, the UE uses the protected decorated NAI format for SUCI for 5G NSWO in which the username is concatenated with the VPLMN ID. The VPLMN ID is also available in plain text in "otherrealm" part. The SUPI of the UE and concatenated VPLMN ID are taken as input for SUCI concealment.

In S2, the UE sends the EAP-ID Response to the WLAN AN as a response to the EAP-ID Request received before S1 (not shown in this figure).

In S3, the WLAN AN sends the SWa protocol message with EAP-ID Response and SUCI to NSWOF.

In S4, the NSWOF fills AN ID with the received plain text of VPLMN ID in SUCI.

In S5, the NSWOF sends the Nausf_UE_Authentication Authenticate Request with SUCI, AN ID and NSWO indicator to the AUSF.

In S6, the AUSF verifies the AN ID with the allowed serving networks. If it is allowed, the AUSF sends the Nudm_UE_Authentication Authenticate Request message with SUCI, AN ID and NSWO indicator towards the UDM, in S7.

In S8, the UDM/SIDF de-conceals the VPLMN ID along with the SUPI from SUCI, and retrieves the VPLMN ID from the concatenated SUPI and VPLMN ID. If the retrieved VPLMN ID in "otherrealm" part is same as the de-concealed VPLMN ID from SUCI, the UDM selects EAP AKA prime for authentication of NSWO. Otherwise, the registration is rejected with a new cause sent from the UDM to AMF. The AMF sends the new reject cause ("WLAN AN not trusted") to UE. UE will not connect to the same WLAN AN and will camp on different WLAN AN. The newly introduced cause is mentioned as above.

In some embodiments, the Nudm_UE_Authentication service operation shall support the request data structures specified in Table 2 and the response data structure and response codes specified in Table 3.

TABLE 2

Data structures supported by the POST Request Body on this resource

| Data type | P | Cardinality | Description |
|---|---|---|---|
| AuthenticationInfo Request | M | 1 | Contains the serving network name and Resynchronization Information |

TABLE 3

Data structures supported by the POST Response Body on this resource

| Data type | P | Cardinality | Response codes | Description |
|---|---|---|---|---|
| AuthenticationInfo Result | M | 1 | 200 OK | Upon success, a response body containing the selected authentication method and an authentication vector if 5G AKA or EAP-AKA' has been selected shall be returned |
| ProblemDetails | O | 0 . . . 1 | 404 Not Found | The "cause" attribute may be used to indicate one of the following application errors: USER_NOT_FOUND |
| ProblemDetails | O | 0 . . . 1 | 403 Forbidden | The "cause" attribute may be used to indicate one of the following application errors: AUTHENTICATION_REJECTED INVALID_HN_PUBLIC_KEY_IDENTIFIER INVALID_SCHEME_OUTPUT INVALID_WLAN_AN |
| ProblemDetails | O | 0 . . . 1 | 501 Not Implemented | The "cause" attribute may be used to indicate one of the following application errors: UNSUPPORTED_PROTECTION_SCHEME This response shall not be cached. |

NOTE:
In addition common data structures as listed in table 5.2.7.1-1 of 3GPP TS 29.500 [4] are supported.

Figure 7:
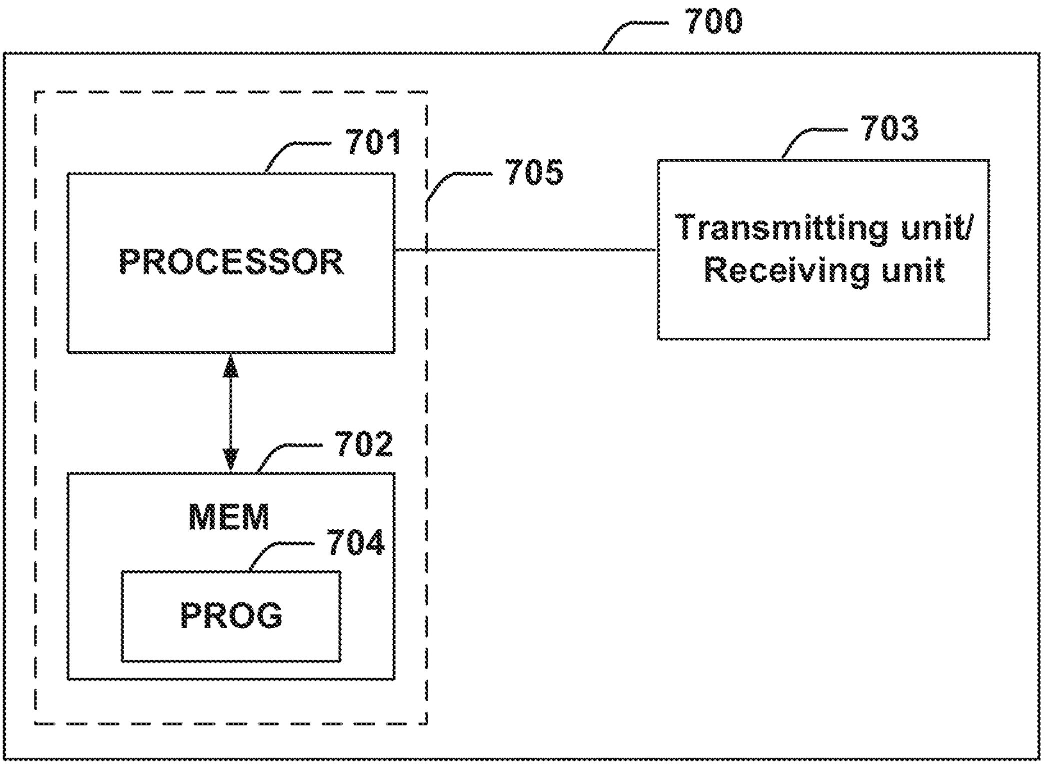
FIG. 7 shows an exemplary structural block diagram of a UE according to some embodiments of the present disclosure.

Now reference is made to FIG. 7 illustrating a schematically structural block diagram of a UE 700. The UE 700 may comprise at least one processor 701, such as a data processor (DP) and at least one memory (MEM) 702 coupled to the at least one processor 701. The UE 700 may further comprise a transmitting unit/receiving unit 703 coupled to the one or more processors 701.

The processors 701 may be of any type suitable to the local technical environment, and may include one or more of the following: general purpose computers, special purpose computers, microprocessors, digital signal processors (DSPs) and processors based on multicore processor architecture, as non-limiting examples.

The MEMs 702 may be of any type suitable to the local technical environment and may be implemented using any suitable data storage technology, such as semiconductor-based memory devices, magnetic memory devices and systems, optical memory devices and systems, fixed memory and removable memory, as non-limiting examples.

The MEM 702 stores a program (PROG) 704. The PROG 704 may include instructions that, when executed on the associated processor 701, enable the UE 700 to operate in accordance with the embodiments of the present disclosure, for example to perform the method 100 as shown in FIG. 1. A combination of the at least one processor 801 and the at least one MEM 702 may form processing circuitry or means 705 adapted to implement various embodiments of the present disclosure.

Figure 8:
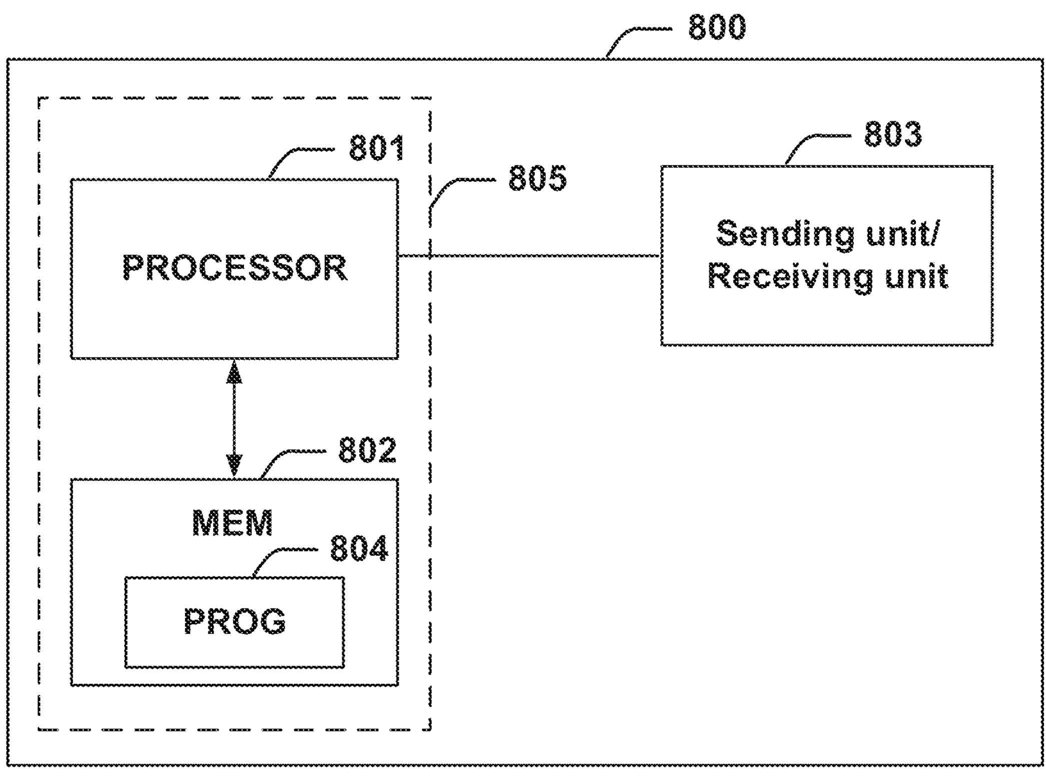
FIG. 8 shows an exemplary structural block diagram of a network entity according to some embodiments of the present disclosure.

FIG. 8 illustrates a schematically structural block diagram of a network entity 800 that may be embodied as the first network entity or the second network entity as described in conjunction with FIGS. 3 and 4 respectively. The network entity 800 may comprise at least one processor 801, such as a data processor (DP) and at least one memory (MEM) 802 coupled to the at least one processor 801. The network entity 800 may further comprise a sending unit/receiving unit 803 coupled to the one or more processors 801.

The processors 801 may be of any type suitable to the local technical environment, and may include one or more of the following: general purpose computers, special purpose computers, microprocessors, digital signal processors (DSPs) and processors based on multicore processor architecture, as non-limiting examples.

The MEMs 802 may be of any type suitable to the local technical environment and may be implemented using any suitable data storage technology, such as semiconductor-based memory devices, magnetic memory devices and systems, optical memory devices and systems, fixed memory and removable memory, as non-limiting examples.

The MEM 802 stores a program (PROG) 804. The PROG 804 may include instructions that, when executed on the associated processor 801, enable the network entity 800 to operate in accordance with the embodiments of the present disclosure, for example to perform one of the methods 300 and 400 as shown in FIGS. 3, 4. A combination of the at least one processor 801 and the at least one MEM 802 may form processing circuitry or means 905 adapted to implement various embodiments of the present disclosure.

Various embodiments of the present disclosure may be implemented by computer program executable by one or more of the processors, software, firmware, hardware or in a combination thereof.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosures may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosures may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium, for example, non-transitory computer readable medium, such as a hard disk, optical disk, removable storage media, solid state memory, RAM, etc. As will be appreciated by one of skills in the art, the function of the program modules may be combined or distributed as desired in various embodiments. In addition, the function may be embodied in whole or in part in firmware or hardware equivalents such as integrated circuits, field programmable gate arrays (FPGA), and the like.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A user equipment, UE, comprising:

one or more processors; and one or more memories storing instructions that, when executed by the one or more processors, cause the UE to:

transmit, to a wireless access node in a wireless access network, a request message for access authentication comprising a concealed identity of the UE in a decorated network access identifier, NAI, format in which a username of the concealed identity of the UE in a NAI format is concatenated with a visited public land mobile network, VPLMN, identifier of a VPLMN serving the UE.

2. The UE according to claim 1, wherein the UE is further caused to:

generate the concealed identity of the UE by ciphering a first identity of the UE concatenated with the VPLMN identifier.

3. The UE according to claim 2, wherein the first identity of the UE comprises a subscription permanent identifier, SUPI, of the UE, and the concealed identity of the UE comprises a subscription concealed identifier, SUCI, of the UE.

4. The UE according to claim 1, wherein the decorated NAI format and the NAI format are used for the fifth generation, 5G, non-seamless wireless local area network offload, NSWO.

5. A first network entity, comprising:

one or more processors; and one or more memories storing instructions that, when executed on the one or more processors, cause the first network entity to:

receive, from a wireless access node in a wireless access network, a first message comprising a concealed identity of a UE to be authenticated in a decorated network access identifier, NAI, format in which a username of the concealed identity of the UE in a NAI format is concatenated with a visited public land mobile network, VPLMN, identifier of a VPLMN serving the UE;

obtain the VPLMN identifier from a realm part of the concealed identity; and send, to a network entity for authentication server function, a request message for authentication comprising the concealed identity of the UE and the obtained VPLMN identifier.

6. The first network entity according to claim 5, wherein the concealed identity of the UE comprises a subscription concealed identifier of the UE.

7. The first network entity according to claim 5, wherein the decorated NAI format and the NAI format are used for 5G non-seamless wireless local area network offload, NSWO.

8. The first network entity according to claim 5, wherein the first network entity is a NSWO function.

9. A second network entity, comprising:

one or more processors; and one or more memories storing instructions that, when executed on the one or more processors, cause the second network entity to:

receive, from a network entity for authentication server function, a request message for authentication credential comprising a concealed identity of a UE to be authenticated in a decorated network access identifier, NAI, format in which a username of the concealed identity of the UE in a NAI format is concatenated with a visited public land mobile network, VPLMN, identifier of a VPLMN serving the UE;

de-conceal the concealed identity of the UE to obtain the VPLMN identifier and a first identity of the UE;

determine whether the de-concealed VPLMN identifier is same as the VPLMN identifier in a realm part of the concealed identity of the UE; and in response to the determination that the de-concealed VPLMN identifier is same as the VPLMN identifier in the realm part, send, to the network entity for authentication server function, a response message for authentication comprising a generated authentication vector and the first identity of the UE.

10. The second network entity according to claim 9, wherein the second network entity is caused to de-conceal the concealed identity of the UE to obtain the VPLMN identifier and the first identity of the UE by:

de-ciphering the concealed identity of the UE to obtain the first identity concatenated with the VPLMN identifier; and retrieving the VPLMN identifier from the concatenated first identity and the VPLMN identifier.

11. The second network entity according to claim 9, wherein the second network entity is further caused to:

send, to a network entity for access and mobility management function associated with the UE, a response message comprising a selected authentication method and a generated authentication vector.

12. The second network entity according to claim 9, wherein the second network entity is further caused to:

in response to the determination that the de-concealed VPLMN identifier is different from the VPLMN identifier in the realm part, send a response messaging indicating a failure cause to the network entity for authentication server function which in turn forwards the failure cause to a network entity for access and mobility management function associated with the UE.

13. The second network entity according to claim 9, wherein the second network entity is further caused to:

in response to the determination that the de-concealed VPLMN identifier is different from the VPLMN identifier in the realm part, send a response message indicating a failure cause to a network entity for access and mobility management function associated with the UE, which in turn sends the failure cause to the UE.

14. The second network entity according to claim 13, wherein the failure cause is indicated in a 5G mobility management cause information element of the response message.

15. The second network entity according to claim 9, wherein the concealed identity of the UE comprises a subscription concealed identifier of the UE, and the first identity of the UE comprises a subscription permanent identifier of the UE.

16. The second network entity according to claim 9, wherein the decorated NAI format and the NAI format are used for 5G non-seamless wireless local area network offload, NSWO.

17. The second network entity according to claim 9, wherein the second network entity is a Unified Data Management, UDM.

* * * * *